United States Patent

[11] 3,581,891

[72] Inventor Alpo Rysti
 Frisansintie 22, Frisans, Finland
[21] Appl. No 782,392
[22] Filed Dec. 9, 1968
[45] Patented June 1, 1971
[32] Priority Sept. 26, 1968
[33] Finland
[31] 2725/68

[54] LOADING AND SORTING DEVICE FOR SAWN TIMBER
3 Claims, 1 Drawing Fig.

[52] U.S. Cl. ................................................. 209/74, 209/90
[51] Int. Cl. ..................................................... B07c 3/02

[50] Field of Search.......................................... 209/74, 90, 125, 73; 198/155

[56] References Cited
UNITED STATES PATENTS
3,399,768  9/1968  Holmberg et al. ............ 209/125

*Primary Examiner*—Allen N. Knowles
*Assistant Examiner*—Gene A. Church
*Attorney*—Richards & Geier ABSTRACT: A device for loading and sorting sawn timber includes a conveyor carrying hooklike members. These hooklike members have shaft portions adapted engage pieces of timber and movable retainers which support these pieces and are adapted to swing and release these pieces which then drop downwardly along the shaft portions.

PATENTED JUN 1 1971  3,581,891
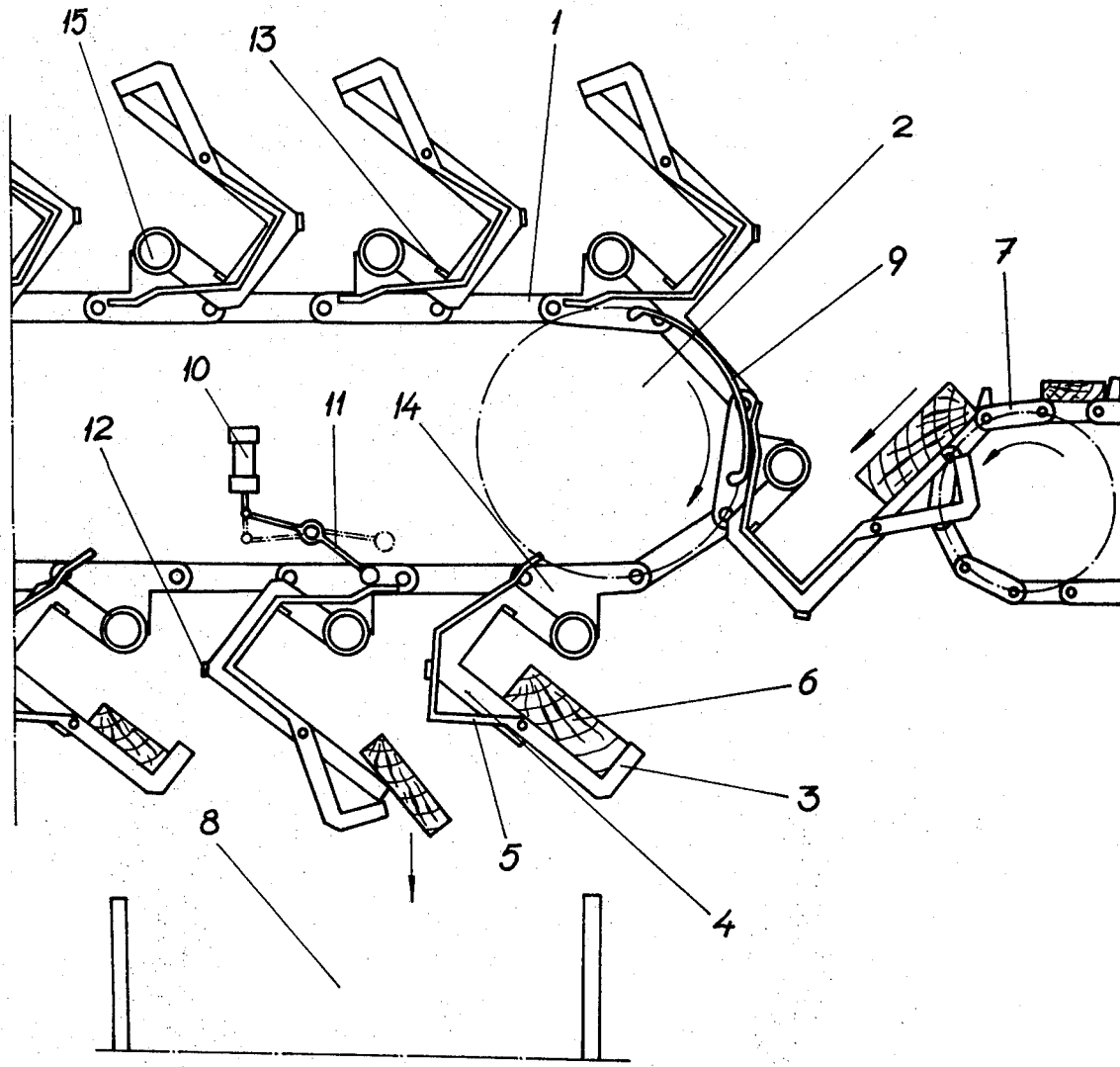
INVENTOR:
A. Rysti
BY
Richards y Geier
ATTORNEYS

LOADING AND SORTING DEVICE FOR SAWN TIMBER

The present invention concerns a device for the loading and sorting of sawn timber, consisting of a conveyor from which are suspended hooklike elements, on the support of which the pieces of timber are transported and which are provided on the conveyor in at least two parallel sequences spaced from each other, whereby transportation of the pieces of timber takes place in transversal position with respect to the direction of travel of the conveyor.

In previously known devices of this type in the first place hooklike elements shaped like a letter L have been used, whereby support of the piece of timber has been furnished by the part of the hooklike element corresponding to the horizontal leg of the letter L. Removal of the piece of timber has been accomplished by imparting to it by means of various devices a sufficiently strong impact in the direction opposite to the direction of travel of the conveyor, thus causing the piece of timber to move away from support of the said leg of the hooklike element. As a consequence of this method of removal, pieces of timber of different weight fall so that they describe different curves of descent, which fact been an impediment to the speed of the conveyor and has also continuously caused disturbances of operation because the delivery of pieces does not take place with adequate accuracy.

Such devices have also been constructed in which removal of the pieces of timber from support by an L-shaped hook takes place by tilting the hook about its upper fixing point. However, the tilting motion requires much space, for which reason the hooks must be located comparatively widely apart, owing to which the handling capacity of such a sorting conveyor will be low.

Within the scope of the invention an attempt is made to eliminate these drawbacks and to accomplish a device in which the delivery takes place with very high accuracy, with the consequence that the conveyor can be operated at higher speed than before without causing the disturbances of operation to increase in frequency. Compared to sorting conveyors which deliver the pieces of timber by tilting, about triple capacity is achieved with a device according to the invention, at the same speed of the conveyor.

A timber loading and sorting device according to the invention is mainly characterized in that the hooklike element comprises a shaft part against which the piece of timber to be transported rests with one side of its cross section, and a movable retainer arranged at the lower end of said shaft part, on the support of which the piece of timber to be transported rests with another side of its cross section and which has been arranged, when the piece of timber is to be delivered, to move and withdraw to the other side of the shaft part, whereby support of the piece of timber is abolished and the piece of timber will fall down along the shaft part.

The invention is described in greater detail in the following with reference to one of its embodiments, which has been shown in the attached sole FIGURE of the drawing. The drawing displays schematically and in elevational view a sorting conveyor for sawn timber, which is also suitable for use in loading operations.

In the drawing one end of the sorting conveyor has been shown, where a chain 1 or equivalent element passes around a reversing shieve 2. There are at least two such chains parallelly placed and separated by a suitable intervening space, while in actual practice there will be several such chains parallelly placed. To each chain 1, hooklike elements 4 have been attached. To the shaft part of the hooklike element a two-armed lever device 5 has been turnably pivoted, the other end of which has been shaped to constitute a retainer 3, on the support of which transportation of the pieces of timber 6 takes place, these pieces of timber having a position transversal to the direction of travel of the conveyor. The reference numeral 7 indicates a feeder conveyor, which feeds pieces of timber 6 into the hooks 4 as can be seen from the figure. In order that it might be possible to eliminate the drawbacks resulting from different stretching of different chains, it has been envisioned in the embodiment shown in the figure that only two chains 1 at relatively great distance from each other are used, which have lugs 14. Corresponding lugs on both chains 1 are joined by a transversal, horizontal bar 15, to which in its turn the requisite number of hooklike members 4 have been fixed. It is advantageous to connect in equivalent manner mutually the two-armed lever devices 5, which are located side by side in the conveyor and which are attached to the hooklike members, whereby they will turn together as an entity.

Delivery of a piece of timber 6 into a given sorting compartment 8 under the sorting conveyor is accomplished by means of a suitable stop arrangement which, when placed in its operating position, acts on the upper end of the two-armed lever arrangement 5, causing the retainer 3 at its lower end to withdraw from under the piece of timber, whereby the latter loses its support and falls down, sliding along the shaft part of the hooklike element 4. As a result of this mode of delivery, all pieces of timber, even those of different weights, will invariably follow a similar path when they fall. In the embodiment presented in the drawing, a stop arrangement 11 operated by a pneumatic cylinder 10 has been used, which acts as a two-armed lever, one end of this lever giving the delivery pulse when desired. Instead of the pneumatic cylinder 10 it is equally possible to use with advantage, e.g., an electromagnetic or a hydraulic actuating device.

In the embodiment shown in the drawing, arrangements have furthermore been made to restrict the sector in which the two-armed lever device 5 attached to the hooklike member 4 turns, to be circumscribed by two extreme positions defined by the stops 12 and 13 provided on the hooklike member. In addition, the weight of the lever device 5 has been so distributed that when the member is under the conveyor the action of gravity tends to keep the retainer 3 under the piece of timber 6, at the same time exerting a given force to counteract removal of the retainer from under the piece of timber. Of course, the same effect may be achieved, for instance, with the aid of an appropriately placed spring. The end of the conveyor adjacent to the reversing shieve 2 has been fitted with a guide 9 intended to ensure that the lever device 5 maintains, for a period of sufficient length, the position which it had while travelling above the conveyor 1, implying that the retainer 3 is not in a position in which it may interfere when the feeding conveyor 7 feeds a piece of timber into the hooklike member 4.

In the instance represented by the drawing, the retainer 3 is located at the lower end of the two-armed lever device 5. It is possible in practice to achieve the withdrawal motion of the retainer 3 also by means of numerous other designs. For instance, the structural element comprising the retainer 3 may be attached with sliding guides to the hooklike member 4, in which case withdrawal of the retainer from under the piece of timber 6 is not a rotatory but a linear movement. The retainer 3 may also be designed to be such that it is turned to one side when it is desired to deliver a piece of timber. In that case one may, for instance, make the shaft of the hooklike member 4 of tubular material and inside which tube a turnable shaft or equivalent has been mounted, its lower end having been bent so that an appropriate retainer is formed. The upper end of this shaft may likewise be provided with an appropriate extension pointing to one side and by means of which turning of the shaft in its journals is accomplished. However, the embodiment shown in the drawing is highly appropriate, e.g., in the respect that its reliability of operation is very good even in conditions with risk of freezing.

The invention is not combined in any other way either, narrowly to the embodiment presented as an example in the drawing. It may rather be modified in various details without departing from the spirit of the invention. It is merely essential that at the lower end of the hooklike member 4 a movable retainer 3 is used, which replaces the similar L leg comprised as an integrally fixed part in the hooklike member of previously known devices. In particular, the shape of the hooklike member 4 may vary, and likewise its shaft part may be placed at different inclinations with reference to the chain 1; the range of variation which is possible in practice is approximately from 45° to 90°. The pieces of timber 6 may also be transported either with their shorter or their longer cross section side supported by the retainers 3.

I claim:

1. Loading and sorting device for sawn timber, consisting of a conveyor from which are suspended hooklike members, on the support of which transportation of the pieces of timber is carried out and which are found on the conveyor in at least two parallel sequences separated by a distance, transportation of the pieces of timber taking place in transversal position with reference to the direction of travel of the conveyor characterized in that the hooklike member includes a shaft means part, against which the piece of timber (6) to be transported rests with one side of its cross section, and a movable retainer means provided beneath said shaft part, on the support of which the piece of timber to be transported rests with another side of its cross section and which has been arranged, when delivery of the piece of timber is made to occur, to move and withdraw to the opposite side of the shaft part, whereby support of the piece of timber is abolished and the piece of timber will be caused to fall down along the shaft part.

2. Device according to claim 1, characterized in that the retainer has been mounted on the lower end of a two-armed lever device which has been turnably attached at its central part to the shaft part and to act upon the upper end of which there has been provided in the device some triggerable stop device previously known in itself, which causes the piece of timber to be delivered.

3. Device according to claim 2, characterized in that the possible range of angular motion of the two-armed lever device has been confined by means of appropriate stops to consist of a given sector.